United States Patent Office 3,404,439
Patented Oct. 8, 1968

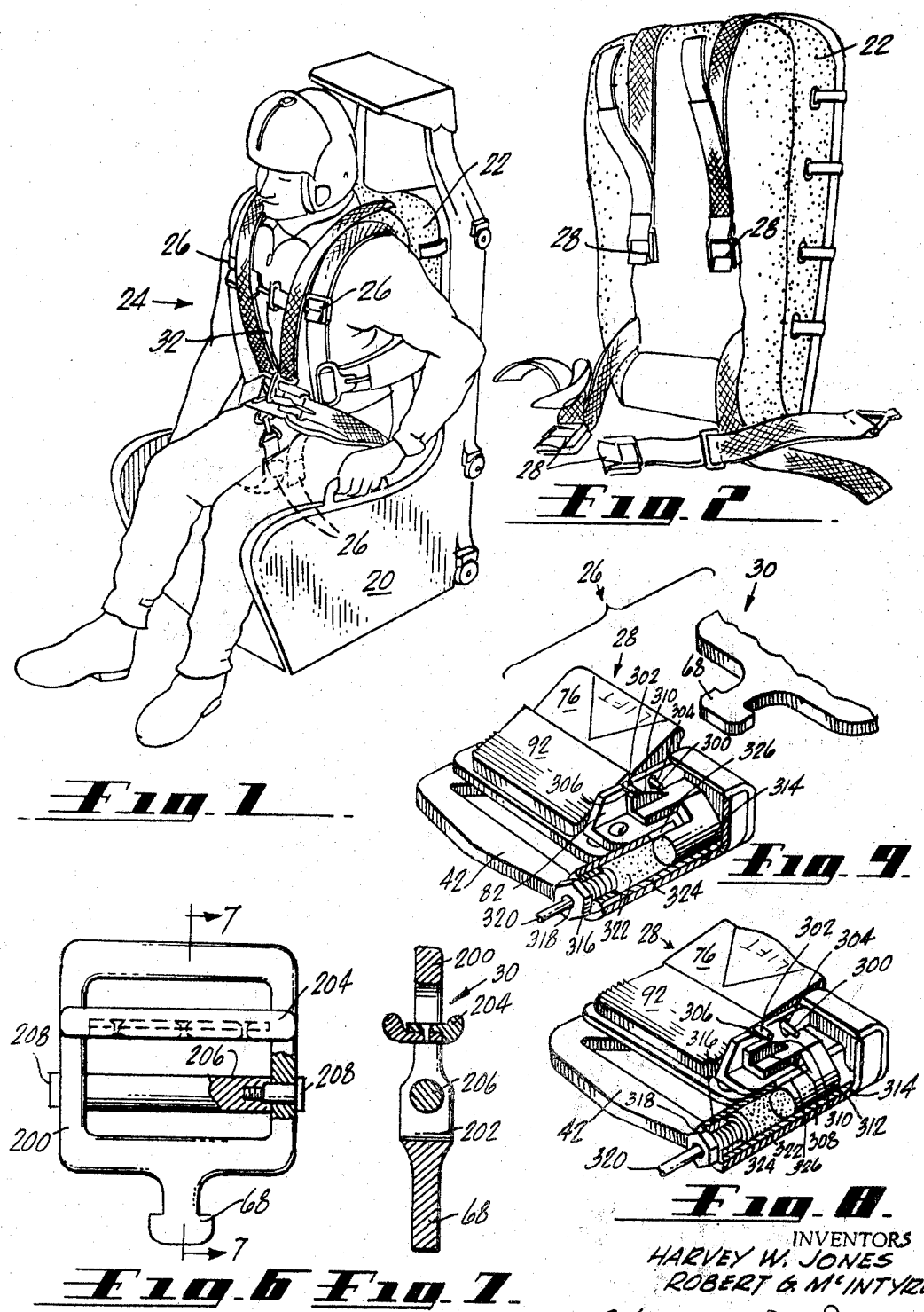

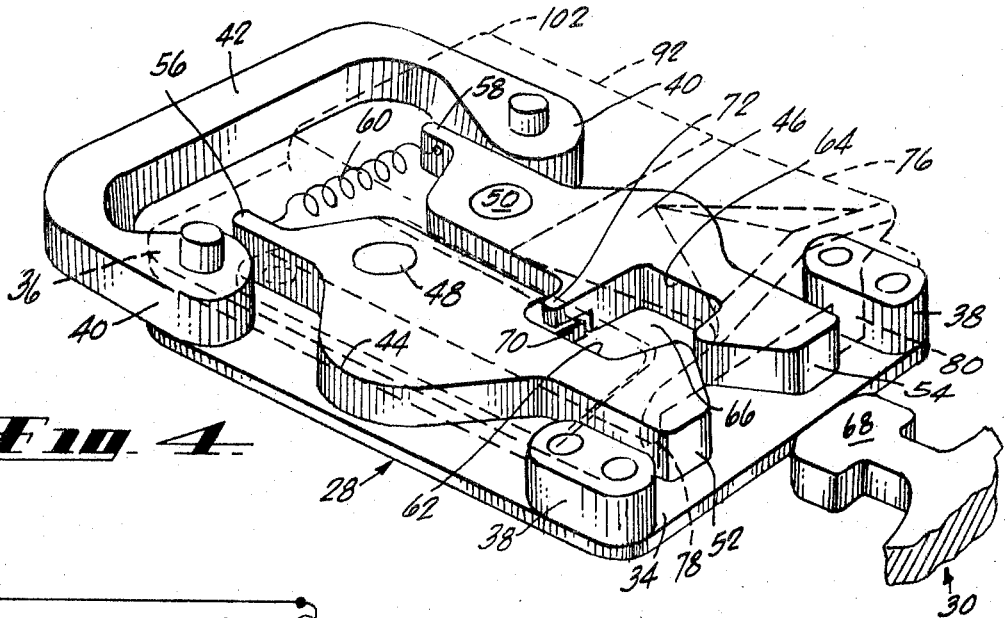

3,404,439
FASTENER FOR USE ON PARACHUTE
HARNESSES
Harvey W. Jones, Long Beach, and Robert G. McIntyre, Manhattan Beach, Calif., assignors, by mesne assignments, to McDonnell Douglas Corporation, Santa Monica, Calif., a corporation of Maryland
Filed May 5, 1966, Ser. No. 547,974
3 Claims. (Cl. 24—230)

ABSTRACT OF THE DISCLOSURE

A fastener comprising a pair of pivoted, spring-biased locking lugs each of which includes a cam portion which can be operated by an actuator to move the lugs to the locked position. To move the lugs to the unlocked position a first unlocking device must be operated prior to the operation of a second unlocking device which releases the locking lugs.

This invention relates to fasteners for securing straps, webbing or belts together or as hereinafter shown and described is directed particularly to fasteners for use on parachute harnesses, although the invention may be used in various other applications and combinations thereof, as for example, for securing straps or webbing to other structures in a cargo harness.

It is of the utmost importance that the straps of a parachute harness be secured together in a manner to preclude accidental release before or during a parachute descent and yet the straps should be capable of easy and quick release after landing. For safety purposes most approved parachute harness fasteners are designed for operation in response to two different actuating movements so that accidental release cannot occur. The fasteners employed for connecting such straps also must be strong and rugged in construction but yet should be relatively light in weight and capable of operation under adverse conditions, as when ground into dirt or immersed in water.

The present invention is meant to be employed in the types of aircraft which use ejection seats, however, the invention has been used to great advantage in aircraft where the crew or passengers are allowed movement within the aircraft. Each pilot wears what is referred to as a torso harness suit about his body. The torso harness suit provides a combination of parachute and crash restraint harnesses, suitable fasteners located on the suit for connection to the parachute and crash restraint harnesses. The suit is constructed of a light-weight nylon fabric through which weight supporting webbing straps are routed. The torso suit is usually worn by the pilot over the flight coverall, antiblackout suit or anti-exposure suit, however, the torso suit may be incorporated in combination therewith.

A parachute is carried by the ejection seat, the parachute also serving the function of a cushion for the pilot's back. The pilot upon seating himself in the ejection seat securely fastens the parachute to his torso suit through four separate fasteners, one over each shoulder and two between his legs. Therefore, in the event of an emergency when an ejection is necessary, the parachute is securely fastened to the pilot. Normally, the parachute remains in the aircraft attached to the seat ejection mechanisms. Upon ejection, the chute is automatically operated requiring no pilot movement.

The fastener of this invention incorporates many advantages over fasteners used heretofore. First, in connecting the parachute harness to the torso suit, the fastener of this invention requires only one quick connecting movement. Second, the established connection of the fastener is positive and relatively strong. Third, the fastener is capable of easily being unlatched with a high tension force such as 600 lb. applied thereto. Fourth, the unlatching of the fastener of this invention requires two separate actions, dependent on each other, to prevent inadvertent opening of the fastener. Fifth, the invention is so designed as to be unlatchable by feel without the benefit of sight. Sixth, once the fastener is opened it will remain in the open position until coaction of the particular male portion of the fastener.

The feature of this fastener to remain in the open position until actuation of the male portion has been discovered to be of great advantage. In aircraft, where the crew, paratroopers or passengers are required to have a parachute yet must be allowed freedom of movement, this invention allows for ease and quick connection to a parachute in an emergency situation. For example, the crew members of a bomber are allowed freedom of movement, such movement would be incumbered by the addition of a parachute. If the bomber were to catch fire or another type of an emergency arise, the crew only need to place themselves in their seats and individually grasp each female portion of the fastener and insert the corresponding male portion. No fumbling or additional movements are necessary to first open the fastener and then insert the male portion. Further, once the male portion is inserted and the locking lugs are closed, the male portion is securely retained with a false locking position being impossible.

Briefly, the fastener of this invention relates to a pair of locking lugs which are spring biased to the open position of the fastener. A lift plate prevents opening of the locking lugs in the closed position. A locking plate must be operated prior to operation of the lift plate which allows opening of the fastener. A male receiving member must be inserted between the locking lugs coacting with a cam portion of the lugs to close the lugs against the action of the spring bias. Once closed, the locking lugs securely retain the male receiving member therebetween.

Further objects and advantages of the invention will appear from the following description thereof in which reference is made to the accompanying drawings wherein:

FIGURE 1 is a perspective view of the fastener of this invention as applied in a typical installation;

FIG. 2 is a perspective view of a parachute pack including the fastener of this invention;

FIG. 3 is a perspective view of the female portion of the fastener of this invention shown in an open position;

FIG. 4 is a perspective view similar to FIG. 3 but showing the inner mechanism of the female portion of this invention in a closed position;

FIG. 5 is a longitudinal sectional view through the fastener of this invention and taken substantially along line 5—5, FIG. 3;

FIG. 6 is a plan view of the male portion of the fastener of this invention;

FIG. 7 is a longitudinal sectional view taken substantially along line 7—7, FIG. 6;

FIG. 8 is a perspective view of a modified form of the female portion of this invention shown in a closed position and adapted to be opened with an electrically fired squib;

FIG. 9 is a perspective view similar to FIG. 8 showing the fastener in an open position; and FIG. 10 is a schematic diagram of the electrical circuit used to energize the embodiment of the invention shown in FIGS. 8 and 9.

Referring particularly to FIGS. 1 and 2 of the drawings, there is shown an aircraft ejection seat 20, a parachute 22 and a pilot 24 as the pilot would be connected to the parachute and crash restraint harnesses. The fastener 26 of this invention is shown connecting the pilot 24 to the parachute 22, four fasteners 26 being employed. The female portion 28 of the fasteners 26 are mounted on the parachute 22, the male portion 30 being secured to the pilot's torso suit 32.

In FIGS. 3, 4 and 5, the fastener of this invention is illustrated in detail. The female portion 28 includes a rectangular base plate 34 and a top plate 36. Plates 34 and 36 are connected together in a parallel relationship through support pads 38 and 40, pads 38 and 40 being positioned at the corners of the rectangular base plate 34. Pads 40 are connected by U-shaped member 42 forming a connection for the webbing of the parachute harness. Contained between the base plate 34 and the top plate 36 are a pair of locking lugs 44 and 46. The lugs 44 and 46 are pivotally secured to the plates 34 and 36 by means of pivot pins 48 and 50, respectively. Each of the lugs 44 and 46 have a head portion 52 and 54, respectively, and a tail portion 56 and 58, respectively. The lugs 44 and 46 are installed so the head portions 52 and 54 face each other and are capable of preventing withdrawal of the male portion 30 if inserted therebetween. A spring 60 is operable between the tail portions 56 and 58, the spring being in constant tension tending to pull together the tail portions 56 and 58. The force of the spring 60 tends to pivot the lugs 44 and 46 about their respective pivot pins 48 and 50 and move the head portions 52 and 54 away from each other to the open or receiving position. The pivot pins 48 and 50 are placed nearer the tail portions 56 and 58 than the head portions 52 and 54 to increase the mechanical advantage in the opening of the head portions 52 and 54. Within each locking lug 44 and 46 is a depression 62 and 64, respectively, located directly adjacent each head portion 52 and 54. Each of the depressions 62 and 64 combine to form cavity 66. Cavity 66 is large enough to contain the strike 68 of the male portion 30. Once the strike 68 is fully inserted within cavity 66, strike 68 contacts interfitting cams 70 and 72 of the locking lugs 44 and 46, respectively. By physically moving strike 68 against the cams 70 and 72, the head portions 52 and 54 are moved toward each other against the action of spring 60, thereby preventing withdrawal of strike 68. Top plate 36 is curved as at 74 to facilitate entry of strike 68.

Once the strike 68 is inserted within cavity 66, a means is required to prevent opening of the lugs 44 and 46 when desired. To accomplish such, a lift plate 76 is provided having depending legs 78 and 80. The lift plate 76 is pivotally secured by pivot shaft 86 within side plates 82 and 84, side plates 82 and 84 being fixedly secured to the top plate 36. The lift plate is spring biased against a lifting action by spring 88. Therefore, it appears obvious that upon the closing of the head portions 52 and 54, the depending legs 78 and 80 will extend between their respective head portions 52 and 54 and their pads 38. In this manner the lugs 44 and 46 are prevented from opening and are not openable until such a time as the lift plate 76 is actuated against spring 88 and moved sufficiently to allow expansion of each of the head portions 52 and 54 to abut their respective pads 38. The lift plate 76 is designed to include an uplifted portion 90 to facilitate lifting by the human finger. Further, because of the uplifted portion 90, it is the natural inclination of the pilot to operate the lift plate 76 by lifting strictly by feel without the benefit of sight.

It is desirable in a fastener of this type to include an additional actuating means so that two separate actions are necessary to open the fastener. Such a dual actuation eliminates inadvertent opening of the fastener which could be disastrous when used on a parachute harness. The additional actuating means is shown in FIG. 3 as a locking plate 92. Locking plate 92 is located directly adjacent the lifting plate 76 flush with the back edge 100 thereof and in the same plane as the lifting plate 76. Locking plate 92 is pivotally secured to the side plates 82 and 84 by pivot pin 94. Locking plate is also spring biased by spring 96 located on spring shaft 98 which is securely fastened to the side plates 82 and 84. To operate the locking plate 92 it is necessary to press on its upper edge 102, rotating the plate 92 about its pivot pin 94 thereby moving its lower edge 104 out of association with the back edge 100 of the lifting plate 76. Thereupon, the actuation of the lifting plate 76 is permitted, such actuation not being prevented by a stop which is the lower edge 104 of the locking plate 92.

The operation of the fastener of this invention is as follows: The pilot 24, with four of the male portions 30 of the fastener 26 attached to his person, seats himself in the ejection seat 20. The parachute 22 is positioned as a back cushion in the ejection seat, the parachute having four separate webbing straps. Each of the webbing straps, at its extremity, is connected to the female portion 28 of the fastener 26 by means of webbing connector 42. Each of the female portions 28 is in the open position (the position shown in FIG. 3) ready to receive the male portion 30. The pilot 24 grasps one of the female portions 28 in one hand and the male portion 30 in the other hand. The male portion 30 is then guided between locking lugs 44 and 46 into cavity 66 and into contact with cams 70 and 72. A small longitudinal force is then exerted on the male portion 30 (or female portion 28) overcoming the action of the spring 60 and causing the head portions 52 and 54 to approach each other. Upon sufficient space being provided for depending legs 78 and 80 of the lift plate 76, legs 78 and 80 become located exteriorly of the lugs thereby preventing the lugs from opening. Locking plate 92 simultaneously assumes its locking position preventing operation of lift plate 76. The pilot 24 then proceeds to connect the remaining three fasteners in the same manner. It is obvious from the foregoing that the locking lugs 44 and 46 enclose strike 68 and prevent withdrawal. The mechanism is so designed as to withstand in the order of a 6000 lb. tension force thereon without failure. Therefore, the pilot is securely fastened to his parachute 22 ready for any emergency which would require use of his parachute 22.

Once the pilot has landed either by parachute or in a normal aircraft landing, the pilot unlatches each of the fasteners 26 and releases himself from the parachute 22. The pilot must first press the locking plate 92 and hold, then lift the lifting plate 76. The head portions 52 and 54 of the locking lugs 44 and 46 separate under action of spring 60 allowing removal of the strike 68 of the male portion 30. The lugs 44 and 46 remain in the open position until reinsertion of its particular male portion 30 which will close the fastener.

The fastener of this invention is designed to allow easy opening with tension force in the order of 600 lb. thereon. Such a feature is necessary if the pilot is being dragged through water or being dragged on land. If the pilot could not remove himself from his parachute in such circumstances, death or serious injury to the pilot could result. Because of the simplicity of construction, the fastener of this invention operates at maximum efficiency after continued use in adverse conditions such as water, salt water, mul and dust.

The male portion 30 of this invention is shown in detail in FIGS. 6 and 7. Male portion 30 is constructed of sheet material having a substantial rectangular body 200. The interior of the body 200 is of open construction forming a substantially rectangular aperture 202. The width of aperture 202 is slightly larger than the width of the webbing of the parachute harness. Strike 68 is integrally connected to the body 200 and extending from one end thereof. Mounted within aperture 202 substantially perpendicular to the longitudinal axis of said strike are an adjustment bar 204 and a mounting rod 206. Adjustment bar 204 is adjustable longitudinally within aperture 202. Such adjustment bars are well-known in the prior art and form no part of this invention. The webbing of the parachute harness is wound around the bar 204, the bar 204 being adjusted to bind the webbing between the bar 204 and the body 202. In this manner the webbing is adjustable within the male portion 30 thereby allowing an individual fit. Mounting rod 206 is removably held by means of screws 208. The webbing of the employed parachute harness employs a loop at its extremity. With this removable rod 206 feature the male portion 30 may be installed in the present systems without damage to the webbing loop by simply removing the rod 206 and inserting such within the loop and attaching the body 200.

In FIGS. 8–10 is shown the inclusion of a firing means which operates to open all four female portions 28 of the fastener 26 simultaneously. The lifting plate 76 and the locking plate 92 of the female portions 28 are each modified to include a transverse pin 300 and 302, respectively. Pin 300 is movable within a slot 304 formed in side plate 82 and pin 302 is movable within depression 306 formed in side plate 82. Each pin 300 and 302 protrudes a short distance from side plate 82. A cam bar 308 is movably mounted on side plate 82 and adapted to contact pins 300 and 302. Cam bar 308 includes a beveled portion 310, the beveled portion 310 being of such an angle as to contact pin 302 prior to pin 304. A piston 312 is integrally connected to cam bar 308, piston 312 being longitudinally slidable within a cylinder housing 314 which is securely attached to the base plate 34 and top plate 36. One end of the cylinder housing 314 is closed by piston 312 with the other end containing a removable plug 316. Plug 316 contains a central aperture 318 through which extends electrical wire 320. A squib 322 is to be placed within cylinder housing 314 between piston 312 and plug 316. It is desirable to include a barrel 324 within cylinder housing 314 within which piston 312 is slidable. The function of barrel 324 is for strengthening purposes. A port 326 is provided within cylinder housing 314 and barrel 324.

The operation of the squib and piston arrangement is believed to be obvious. An electrical impulse is provided through wire 320, igniting squib 322. The expansion of the gases from squib 322 moves piston 312 and integral cam bar 308. Bevel 310 first contacts pin 302 which rotates the locking plate 92 into the unlatched position. Bevel 310 then contacts pin 300 which rotates the lifting plate 76 into the unlatched position. Thereupon, male portion 30 may be removed from the female portion 28. Excess gases from squib 322 are expelled through port 326 upon completion of the opening movement of piston 312.

To operate all the fasteners simultaneously, an electrical system such as shown in FIG. 10 is provided. A battery 328 is provided which is connected to a switch 330. Electrically connected in a parallel relationship are four primers 332, one located in each squib 322. Upon activation of switch 330 an electrical charge is passed to each of the primers 332, thereby, exploding squib 322. In this manner all four fasteners 26 are opened simultaneously and quickly. The pilot is then guaranteed practically instantaneous removal from his parachute during a dragging.

The operation of the fastener illustrated is simple and positive in both its connecting and disconnecting movements. It thus affords the maximum safety under all conditions of use. Furthermore, the construction is small, simple and light in weight and broad tolerances may be employed in the manufacture of the components thereof. Accordingly, even though dirt and other foreign materials should enter the fastener, the device is capable of easy operation under the most adverse conditions.

The particular forms of the present invention shown in the drawings and described herein have been found to be most satisfactory. However, the various elements of the combinations and the forms, constructions and arrangements thereof are capable of numerous changes and modifications. In view thereof, it should be understood that the forms of the invention shown in the drawings and herein described are intended to be illustrative only and are not intended to limit the scope of the invention. The scope of the invention, to be limited only by a just interpretation of the following claims.

We claim:
1. A device for releaseably connecting separate members comprising:
   a pair of locking lugs, each of said locking lugs cooperating with each other to form a locking unit, said locking lugs being movable in the same plane and with respect to each other, said movement of said lugs being from a locked position to an unlocked position;
   said first spring means operating between said pair of locking lugs for biasing said locking lugs to said unlocked position;
   a cam means included on each of said locking lugs, said cam means being contactable by an actuator, said cam means upon actuation by said actuator resulting in movement of said locking lugs from said unlocked position to said locked position;
   each of said pair of locking lugs being pivotally mounted by pivot pins to a base plate, said locking lugs having head portions and tail portions, said pivot pins being mounted between said head portions and said tail portion of each locking lug but nearer said tail portion, said first spring means being operable between the tail portions of each of said locking lugs, said head portions being constructed to retain said actuator when said locking lugs are in the locked position; and
   said cam means of each locking lug being located intermediate said pivot pin and said head portion, said said cam means of said locking lugs being located in an interfitting relationship.

2. A device for releasably connecting separate members comprising:
   a pair of locking lugs, each of said locking lugs cooperating with each other to form a locking unit, said lugs being movable in the same plane and with respect to each other, said movement of said lugs being from a locked position to an unlocked position;
   a first spring means operating between said pair of locking lugs for biasing said locking lugs to said unlocked position;
   a cam means included on each of said locking lugs, said cam means being contactable by an actuator, said cam means upon actuation by said actuator resulting in movement of said locking lugs from said unlocked position to said locked position;
   unlocking means being provided to allow said first spring means to move said locking lugs to said unlocked position, said unlocking means comprising a lift plate having depending arms, when said locking lugs are in said locked position said depending arms prevent movement of said lugs to said unlocked position, said lift plate being spring biased by a second spring means to prevent movement of said lugs to said unlocked position, whereby said lift plate necessitates the employment of a force to overcome said second spring means and move said depending arms sufficiently to allow said locking lugs to move to said unlocked position; and
   said unlocking means includes an additional locking plate, said locking plate being spring biased by a third spring means to prevent actuation of said lift plate, whereby to allow said locking lugs to move to said unlocked position said locking plate must be actuated prior to actuation of said lift plate.

3. A device for releasably connecting separate members as defined in claim 2 wherein:
   a gas operated piston is connected to said unlocking means, whereby an electrical current is provided to a gas generating means to initiate the gas generation and operate said gas operated piston, said gas operated piston actuating said unlocking means and opening said locking lugs.

References Cited

UNITED STATES PATENTS

| 2,654,135 | 10/1953 | Grizzard. |
| 2,863,200 | 12/1958 | Miller. |
| 3,104,909 | 9/1963 | Walker. |
| 3,179,997 | 4/1965 | Jalinaud. |
| 3,196,824 | 7/1965 | Howard. |
| 3,311,188 | 3/1967 | Gutshall. |

FOREIGN PATENTS

| 482,691 | 9/1938 | Great Britain. |
| 326,459 | 5/1935 | Italy. |

BERNARD A. GELAK, *Primary Examiner.*